(12) United States Patent
Thomas et al.

(10) Patent No.: US 11,803,181 B2
(45) Date of Patent: Oct. 31, 2023

(54) FLEXIBLE MODULAR PLATFORM PLANT NAVIGATION SYSTEM

(71) Applicant: Ford Global Technologies, LLC, Dearborn, MI (US)

(72) Inventors: Galen Keith Thomas, Dearborn, MI (US); Kerry Lance Paskell, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 307 days.

(21) Appl. No.: 17/165,476

(22) Filed: Feb. 2, 2021

(65) Prior Publication Data
US 2021/0397178 A1 Dec. 23, 2021

Related U.S. Application Data

(63) Continuation-in-part of application No. 16/909,462, filed on Jun. 23, 2020.

(51) Int. Cl.
*G05D 1/00* (2006.01)
*G05B 19/418* (2006.01)
*G05D 1/02* (2020.01)

(52) U.S. Cl.
CPC ......... *G05D 1/0011* (2013.01); *G05D 1/0238* (2013.01); *G05B 19/41805* (2013.01);
(Continued)

(58) Field of Classification Search
CPC .............. G05D 1/0027; G05D 1/0297; G05D 2201/0216; G05D 1/0212; G05D 1/0234; G05D 1/0022; G05D 1/0011; G05D 1/0223; G05B 19/41895; G05B 19/41805; G05B 2219/50393; G05B 2219/32388; G01C 21/206
See application file for complete search history.

(56) References Cited

U.S. PATENT DOCUMENTS 7,036,848 B2 5/2006 Chernoff et al.
10,322,802 B1 * 6/2019 Krishnaswamy .... G01C 21/206
(Continued)

FOREIGN PATENT DOCUMENTS

CN 109625092 4/2019

*Primary Examiner* — Khoi H Tran
*Assistant Examiner* — Tanner L Cullen
(74) *Attorney, Agent, or Firm* — Burris Law, PLLC

(57) ABSTRACT

A navigation system for remote control movement of modular vehicle subassemblies (MVSs) through a plurality of assembly zones of a vehicle assembly facility includes a predefined primary pathway configured for the MVSs to move along during assembly of top hats on the MVSs, a plurality of sensors, a plurality of zone controllers, and a central management system with a navigation algorithm. The plurality of sensors are configured to transmit at least one of proximity data and visual data on the MVSs moving through the plurality of assembly zones to the plurality of zone controllers. The central management system is configured to be in communication with each of the plurality of zone controllers and the navigation algorithm is configured to receive the at least one of proximity data and visual data and calculate movement instructions for remote control movement of the MVSs moving through the plurality of assembly zones.

20 Claims, 10 Drawing Sheets

(52) U.S. Cl.
CPC ............... *G05B 19/41895* (2013.01); *G05D 2201/0216* (2013.01)

(56) References Cited

U.S. PATENT DOCUMENTS

| | | | |
|---|---|---|---|
| 2018/0259975 A1* | 9/2018 | Dold | G05D 1/0297 |
| 2018/0275681 A1 | 9/2018 | Gariepy et al. | |
| 2020/0026273 A1* | 1/2020 | He | G05D 1/0022 |
| 2020/0073363 A1* | 3/2020 | Albrecht | G05B 19/4063 |
| 2020/0140028 A1* | 5/2020 | Wells | B60L 53/12 |
| 2020/0202730 A1* | 6/2020 | Nayak | G08G 5/045 |
| 2020/0209870 A1* | 7/2020 | Khasawneh | G05D 1/0214 |
| 2021/0179153 A1* | 6/2021 | Harasaki | B61L 27/30 |
| 2021/0339396 A1* | 11/2021 | Denenberg | G06T 17/10 |

\* cited by examiner

FLEXIBLE MODULAR PLATFORM PLANT NAVIGATION SYSTEM

CROSS-REFERENCE TO RELATED APPLICATIONS

This application claims the benefit of and is a continuation-in-part of U.S. patent application Ser. No. 16/909,462 filed on Jun. 23, 2020, which is commonly assigned with the present application. This application is also related to co-pending applications filed concurrently herewith titled "FLEXIBLE MODULAR PLATFORM", "METHOD OF VEHICLE ASSEMBLY INCLUDING MODULAR VEHICLE SUBASSEMBLY CONTROLS, COMMUNICATION AND MANUFACTURE", "FACILITY SENSORY SYSTEM FOR MONITORING, GUIDING, AND PROTECTING FLEXIBLE MODULAR PLATFORMS MOVING THROUGH AN ASSEMBLY LINE", and "METHOD OF STORING, PROCESSING, AND TRANSMITTING DIGITAL TWINS FOR FLEXIBLE MODULE PLATFORMS AND VEHICLES", which are commonly assigned with the present application. The contents of these patent applications are incorporated herein by reference in their entireties.

FIELD

The present disclosure relates to assembly lines and particularly to moving vehicles on assembly lines.

BACKGROUND

The statements in this section merely provide background information related to the present disclosure and may not constitute prior art.

Vehicles are typically manufactured in assembly plants designed and built to support a projected vehicle assembly volume based on mechanical infrastructure requirements needed to support manufacturing operations. And such mechanical infrastructure requirements typically include conveyer systems and/or automatic guided vehicle (AGV) based systems to move vehicle subassemblies from station to station along an assembly line. However, the time, investment and capital expenditure needed to build conveyer systems or to adapt AGVs for specific application tasks can be prohibitive.

These issues associated with assembly lines in vehicle assembly plants, among other issues related to manufacturing different product configurations in the same assembly facility, are addressed by the present disclosure.

SUMMARY

This section provides a general summary of the disclosure and is not a comprehensive disclosure of its full scope or all of its features.

In one form of the present disclosure, a navigation system for remote control movement of modular vehicle subassemblies (MVSs) through a plurality of assembly zones of a vehicle assembly facility includes a predefined primary pathway configured for the MVSs to move along during assembly of top hats on the MVSs, a plurality of sensors, a plurality of zone controllers, and a central management system with a navigation algorithm. The plurality of sensors are configured to be assigned to the plurality of assembly zones such that each of the plurality of assembly zones has at least one of the plurality of sensors assigned thereto, and the plurality of sensors are configured to transmit at least one of proximity data and visual data on the MVSs moving through the plurality of assembly zones to the plurality of zone controllers. The plurality of zone controllers are configured to be assigned to the plurality of assembly zones such that each of the plurality of assembly zones has at least one of the plurality of zone controllers assigned thereto, and each of the plurality of zone controllers is configured to be in communication with at least one of the plurality of sensors and receive the at least one of proximity data and visual data. Also, the central management system is configured to be in communication with each of the plurality of zone controllers and the navigation algorithm is configured to receive the at least one of proximity data and visual data and calculate pathway adjustment instructions for remote control movement of the MVSs moving through the plurality of assembly zones.

In some variations, the system further includes markers assigned to the predefined primary pathway, and the markers comprise at least one of a visual marker, an assembly path marker, and an infrastructure marker.

In at least one variation, the plurality of sensors includes at least one of a plurality of vision sensors and a plurality of a proximity sensors. In such variations, the plurality of vision sensors are configured to transmit the visual data, and the visual data comprises pathway alignment visual data for the MVSs moving through the plurality of assembly zones. Also, the plurality of proximity sensors are configured to transmit the proximity data, the proximity data comprising at least one of pathway alignment data of the MVSs moving through the plurality of assembly zones, detection data on the MVSs entering the plurality of assembly zones, tracking data of the MVSs moving through the plurality of assembly zones, distance data of the MVSs approaching the plurality of assembly zones, distance data of the MVSs leaving the plurality of assembly zones, speed data of at least one object approaching the MVSs moving through the plurality of assembly zones, location data of at least one object approaching the MVSs moving through the plurality of assembly zones, and distance data between at least one object and the MVSs moving through the plurality of assembly zones.

In some variations, the pathway adjustment instructions comprise pathway alignment adjustment instructions, MVS speed adjustment instructions, MVS halt instructions, and MVS accelerate instructions. In at least one variation, a plurality of assembly stations along the predefined primary pathway are included, and the plurality of zone controllers are configured to transmit the MVS halt instructions to the MVSs moving through the plurality of assembly zones such that each MVS halts at one or more of the assembly stations. In such variations, each of the plurality of assembly stations is configured to assembly at least one component on a given MVS that halts at a given assembly station. Also, the central management system is configured to evaluate the assembly of the at least one component on the given MVS that halts at the given assembly station. In some variations, the central management system is configured to determine a successful evaluation and an unsuccessful evaluation for the assembly of the at least one component on the given MVS that halts at the given assembly station. And in such variations, the central management system is configured to assign at least one of a line side repair flag and a line removal repair flag for a determined unsuccessful evaluation for the assembly of the at least one component on the given MVS that halts at the given assembly station.

In some variations, the navigation algorithm is configured to calculate a potential impact parameter for at least one object approaching at least one of the plurality of MVSs as a function of the at least one of proximity data and visual data.

In at least one variation, the system includes a plurality of onboard controllers configured to be assigned to the MVSs such that each of the MVSs has an onboard controller, and each of the plurality of onboard controllers is configured to be in wireless communication with at least one of the plurality of zone controllers during movement of the MVSs moving through the plurality of assembly zones. In some variations, each of the plurality of zone controllers are configured to detect a broken wireless communication connection and execute a reconnect wireless communication request with at least one onboard controller (e.g., an onboard controller with which the broken wireless communication was detected). In such variations, the plurality of onboard controllers can be configured to execute a MVS stop command. In some variations, each of the plurality of zone controllers are configured to notify the central management system of the broken wireless communication. Also, each of the plurality of zone controllers can be configured to transmit a self-test command to an onboard controller with which the broken wireless communication was detected.

In another form of the present disclosure, a navigation system for remote control movement of MVSs through a plurality of assembly zones of a vehicle assembly facility includes a predefined primary pathway configured for the MVSs to move along during assembly of top hats on the MVSs, markers assigned to the predefined primary pathway, a plurality of sensors, a plurality of onboard controllers, a plurality of zone controllers, and a central management system with a navigation algorithm. The plurality of sensors are configured to be assigned to the plurality of assembly zones such that each of the plurality of assembly zones has at least one of the plurality of sensors assigned thereto, at least a first subset of the plurality of sensors is configured to detect the markers, and at least a second subset of the plurality of sensors is configured to transmit at least one of proximity data and visual data of the MVSs moving through the plurality of assembly zones to the plurality of zone controllers. The plurality of onboard controllers are configured to be assigned to the MVSs such that each of the MVSs has an onboard controller and the plurality of zone controllers are configured to be assigned to the plurality of assembly zones such that each of the plurality of assembly zones has at least one of the plurality of zone controllers assigned thereto. Each of the plurality of zone controllers is configured to be in communication with at least one of the plurality of sensors and the plurality of onboard controllers and receive the at least one of proximity data and visual data. And the central management system is configured to be in communication with each of the plurality of zone controllers and the navigation algorithm is configured to receive the at least one of proximity data and visual data, and calculate pathway adjustment instructions for remote control movement of the MVSs moving through the plurality of assembly zones. And the navigations system is configured to transmit the pathway adjustment instructions to the MVSs for remote control movement of the MVSs moving through the plurality of assembly zones.

In some variations, the pathway adjustment instructions include pathway alignment adjustment instructions, MVS speed adjustment instructions, MVS halt instructions, and MVS accelerate instructions.

In at least one variation, the navigation system further includes a plurality of assembly stations along the predefined primary pathway, and the plurality of zone controllers are configured to transmit the MVS halt instructions to the MVSs moving through the plurality of assembly zones such that each MVS halts at one or more of the assembly stations. In such variations, each of the plurality of assembly stations can be configured to assembly at least one component on a given MVS that halts at a given assembly station.

In still another form of the present disclosure, a navigation system for remote control movement of MVSs through a plurality of assembly zones of a vehicle assembly facility includes a predefined primary pathway configured for the MVSs to move along during assembly of top hats on the MVSs, markers assigned to the predefined primary pathway, a plurality of sensors, a plurality of onboard controllers, a plurality of zone controllers, a central management system, and a navigation algorithm configured to calculate pathway adjustment instructions. The plurality of sensors are configured to be assigned to the plurality of assembly zones such that each of the plurality of assembly zones has at least one of the plurality of sensors assigned thereto, at least a first subset of the plurality of sensors is configured to detect the markers, and at least a second subset of the plurality of sensors is configured to transmit at least one of proximity data and visual data of the MVSs moving through the plurality of assembly zones to the plurality of zone controllers. The plurality of onboard controllers are configured to be assigned to the MVSs such that each of the MVSs has an onboard controller. The plurality of zone controllers are configured to be assigned to the plurality of assembly zones such that each of the plurality of assembly zones has at least one of the plurality of zone controllers assigned thereto and each of the plurality of zone controllers is configured to be in communication with at least one of the plurality of sensors and the plurality of onboard controllers and receive the at least one of proximity data and visual data. The central management system is configured to be in communication with each of the plurality of zone controllers and the navigation algorithm is configured to receive the at least one of proximity data and visual data, calculate pathway adjustment instructions for remote control movement of the MVSs moving through the plurality of assembly zones.

In some variations, the pathway adjustment instructions include pathway alignment adjustment instructions, MVS speed adjustment instructions, MVS halt instructions, and MVS accelerate instructions.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
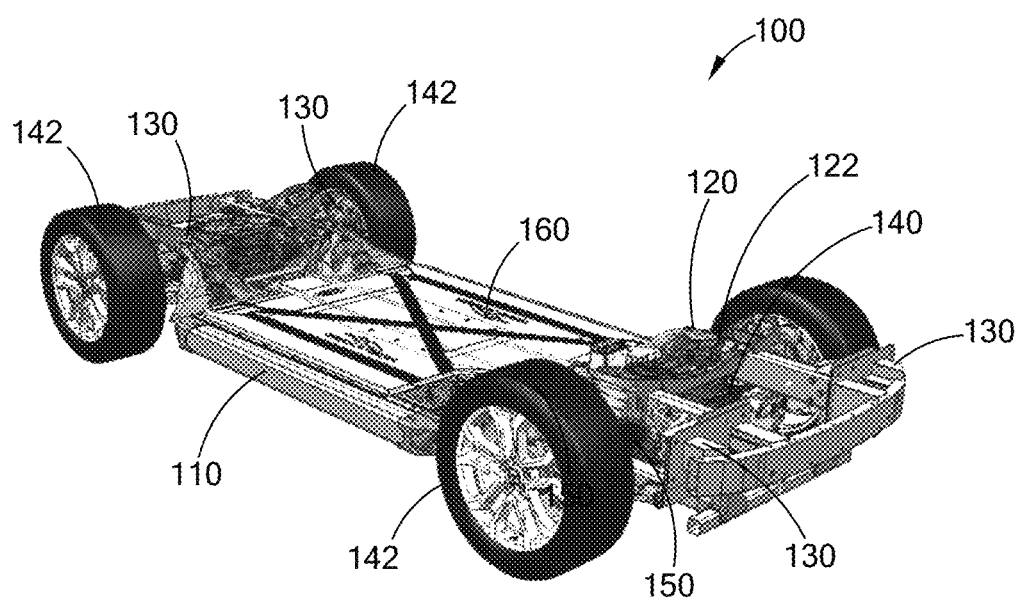
FIG. 1 is a perspective view of a modular vehicle subassembly according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a navigation system for remote control movement of a modular vehicle assemblies though a plurality of assembly zones of a vehicle assembly facility. Referring to FIG. 1, one example of a modular vehicle subassembly (MVS) 100 (also known as a "flexible modular platform") according to the teachings of the present disclosure is shown. The MVS 100 includes a frame 110, an onboard controller 120, an onboard communications link 122, transient data sensors 130, a drive system 140, wheels 142 mounted on the frame 110, a steering system 150, a braking system 155, and a propulsion system 160. As used herein, the phrase "communication link" refers to a communication channel that connects two or more devices for the purpose of data transmission. In at least one variation the onboard communications link 122 is a wireless communications link with a wireless signal receiver/transmitter that includes an antenna. In some variations, the MVS 100 is for an electric or hybrid vehicle and the propulsion system 160 includes one or more charged batteries that provides energy to the onboard controller 120, transient data sensors 130, drive system 140, steering system 150, and braking system 155.

The MVS 100, and other MVSs disclosed herein, is manufactured at a vehicle assembly facility and is self-transportable. That is, the MVS 100 is configured to move using its own power and steering through the same vehicle assembly facility where it was manufactured and/or through a separate vehicle assembly facility where additional assembly operations occur. For example, a plurality of MVSs 100 (also referred to herein simply as "MVSs 100") can be wireless tethered together and/or wirelessly tethered to an assembly line infrastructure and thereby move under remote or autonomous control using their own power and steering along a predefined path prior through one or more assembly zones as discussed in greater detail below.

In some variations of the present disclosure the one or more assembly zones are part of a vehicle assembly facility that assembles a "top hat" onto the MVSs 100. As used herein the term phrase "assembly zone" refers to area, station or region of an assembly line where a predetermined number of components or parts are assembled onto a MVS 100 moving along the assembly line. And as used herein the phrase "top hat" refers to one or more vehicle upper body structures that can share a common platform (i.e., a common MVS 100). For example, the upper body structures can vary from a crossover vehicle to a sedan vehicle to a coupe vehicle. Accordingly, vehicle assembly facilities that assembly different vehicle upper body structures onto a common MVS 100 enhance economies of scale and product differentiation and are included within the teachings of the present disclosure.

Figure 2:
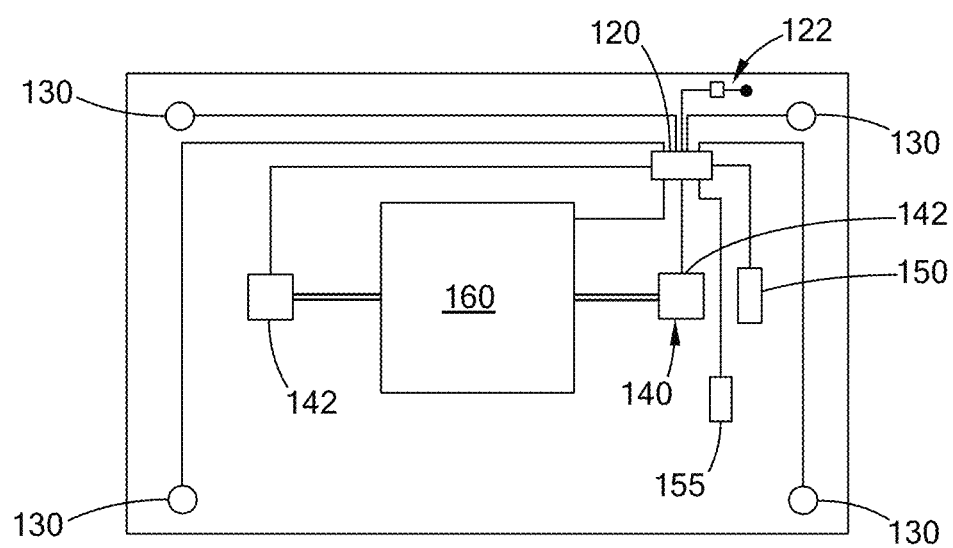
FIG. 2 is a block diagram of a remote controlled modular vehicle subassembly according to the teachings of the present disclosure.

Referring to FIG. 2, an example functional block diagram of the MVS 100 is shown. The MVS 100 includes the onboard controller 120, the onboard communications link 122, transient data sensors 130, the drive system 140, the steering system 150, the braking system 155, and the propulsion system 160. Also, and as shown in FIG. 2, the onboard controller 120 is in communication with the onboard communications link 122, transient data sensors 130, drive system 140, steering system 150, braking system 155, and propulsion system 160.

The onboard communications link 122 and the transient data sensors 130 are configured to transmit at least one of signals, data, and commands (referred to herein simply as "information") to the onboard controller 120 and the onboard controller 120 is configured to receive the information from the onboard communications link 122 and the transient data sensors 130. In some variations, the onboard controller 120 is configured to transmit additional information in response to or as a function of the information received from the onboard communications link 122 and/or transient data sensors 130. For example, in some variations the onboard controller 120 transmits additional information to the transient data sensors 130, the drive system 140, the steering system 150, the braking system 155, and/or the propulsion system 160 (e.g., via the onboard communications link 122). And in at least one variation the onboard controller 120 transmits additional information to an external controller via the onboard communications link 122.

The transient data sensors 130 of the MVS 100 can be proximity sensors, vision sensors, fluid level sensors, energy level sensors, electrical connection sensors, among others, that provide transient data to the onboard controller 120. Non-limiting examples of transient data provided by the transient data sensors 130 include data on or related to MVS 100 location, MVS 100 position, MVS 100 movement, obstacle detection along a path the MVS 100 is moving along, general environmental conditions around the MVS 100, fluid level in a container assembled onto the MVS 100, pressure level in a container assembled onto the MVS 100, charge level of an electric battery of the MVS 100, resistance of a connection between two electrical components assembled onto the MVS 100, operation of a component assemble onto the MVS 100, among others. Accordingly, the transient data sensors 130 provide notification on how a given MVS 100 is performing operational activities such as alignment on an assembly path, tracking of a given MVS 100 along the assembly path, and obstacle avoidance on the assembly path as the MVS 100 moves within a vehicle assembly facility. In addition, the transient data sensors 130 can provide assembly information of a top hat being assembled onto the MVS 100 as the MVS 100 moves through one or more assembly zones.

The onboard controller 120 is configured to direct the propulsion system 160 to provide power to the drive system 140 and direct the drive system 140 to drive at least one of the wheels 142 such that the MVS 100 moves across a surface (e.g., a floor or road). As used herein, the term 'drive" refers to rotating an object (e.g., a wheel) by applying a force causing the object to rotate. Accordingly, the propulsion system 160 is configured to provide power to the drive system 140 and the drive system 140 is configured to rotate the wheels 142.

In some variations, the propulsion system 160 is an electric propulsion system with one or more electric batteries that provide electric power to the drive system 140. In other variations, the propulsion system 160 is a hybrid propulsion system with one or more electric batteries and an internal combustion engine (ICE) that provides a combination of electric power and mechanical power (converted from chemical energy) to the drive system 140. In at least one variation the MVS 100 includes a hybrid propulsion system that uses electric power to move through one or more assembly zones.

The onboard controller 120 is also configured to direct the steering system 150 to steer at least one of the wheels 142 (e.g., the front two wheels 142) such that the MVS 100 follows or moves along a desired pathway. As used herein, the term "steer" or "steering" refers to guiding or controlling directional movement of a vehicle by turning at least one wheel of the vehicle. Accordingly, the steering system 150 is configured to change a course or direction of the MVS 100. As used herein the phrase "course of direction" refers to a direction or path along which the MVS 100 is moving.

In at least one variation the onboard controller 120 is configured to direct the braking system 155 to apply a braking force such that the wheels 142 are inhibited from turning or rotating. And in some variations the onboard controller 120 is configured to direct the braking system 155 to apply an emergency braking force such that the MVS 100 and/or other MVSs 100 stop moving when an obstacle is detected approaching a predefined pathway the MVS 100 is moving along.

Figure 3B:
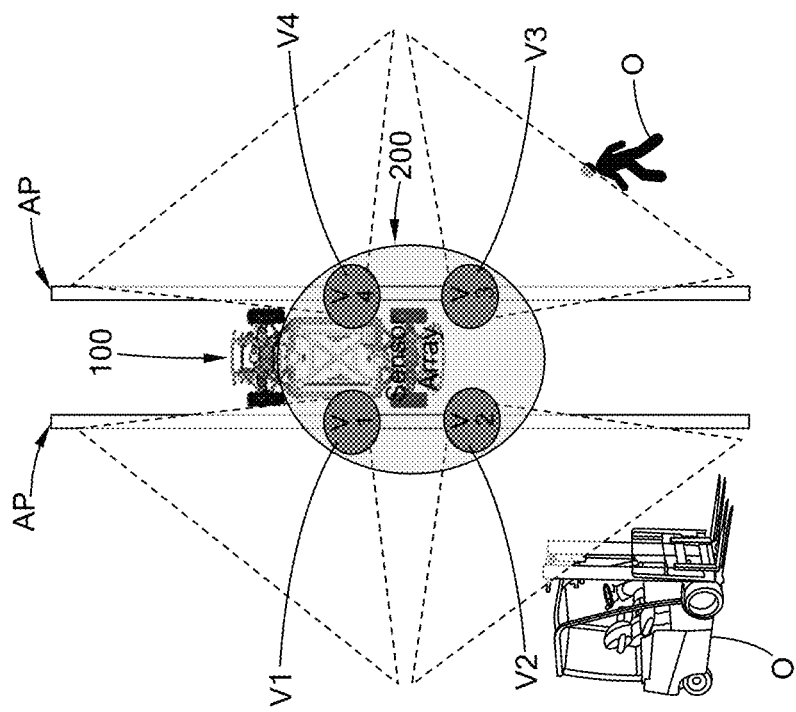
FIG. 3B is the vision sensor array in FIG. 3A and a wide field of view scan according to the teachings of the present disclosure.
Figure 3A:
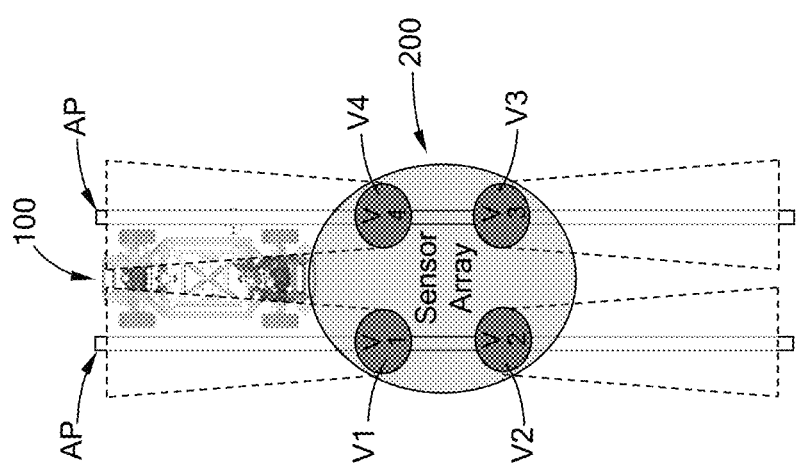
FIG. 3A is a vision sensor array and a narrow field of view scan according to the teachings of the present disclosure.

While the MVS 100 is configured to move under its own power through a vehicle assembly facility (e.g., a top hat assembly facility), and a noted above, a navigation system is employed for remote control movement of the MVS 100. And in some variations the navigation system includes facility-based or facility-integrated sensors to assist in the navigation of the MVS 100. For example, and with reference to FIGS. 3A and 3B, one non-limiting example of facility based sensors is a vision sensor array 200 positioned along an assembly path 'AP' of an vehicle assembly facility on which a plurality of MVSs 100 move along is shown. The vision sensor array 200 includes a plurality of vision sensors V1, V2, V3, V4 configured to scan or provide one or more fields of view on one or more areas proximal to the vision sensor array 200 and a MVS 100 moving along the assembly path AP. For example, in some variations the plurality of vision sensors V1-V4 provide vision data on a narrow field of view as shown in FIG. 3A. In the alternative, or in addition to, the plurality of vision sensors V1-V4 provide vision data on a wide field of view as shown in FIG. 3B. Non-limiting examples of vision data provided by the narrow field of view include alignment data on a MVS 100 moving along the assembly path AP and obstacle detection on the assembly path AP, among others. And non-limiting examples of vision data provided by the wide field of view include notification data on an object on the assembly path AP, notification data on an object approaching the assembly path AP, notification data on an object approaching a MVS 100 moving along the assembly path AP, tracking data on an object approaching the assembly path AP, tracking data on an object approaching a MVS 100 moving along the assembly path AP, among others. In some variations the plurality of vision sensors V1-V4 are monochrome vision sensors, while in other variations the plurality of vision sensors V1-V4 are color vision sensors. And in at least one variation the plurality of vision sensors V1-V4 are a combination of monochrome vision sensors and color vision sensors.

Figure 4B:
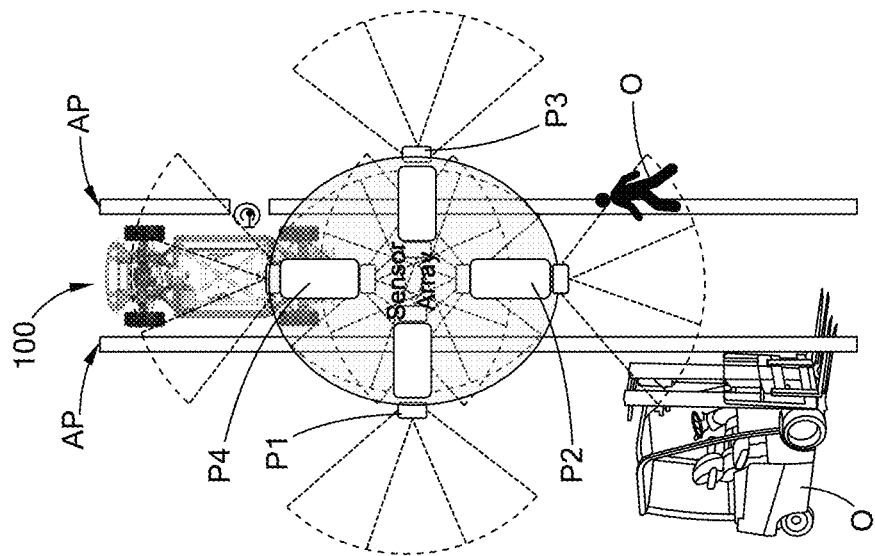
FIG. 4B is the proximity sensor array in FIG. 4A detecting an object on or approaching the modular vehicle assembly and/or the assembly pathway according to the teachings of the present disclosure.
Figure 4A:
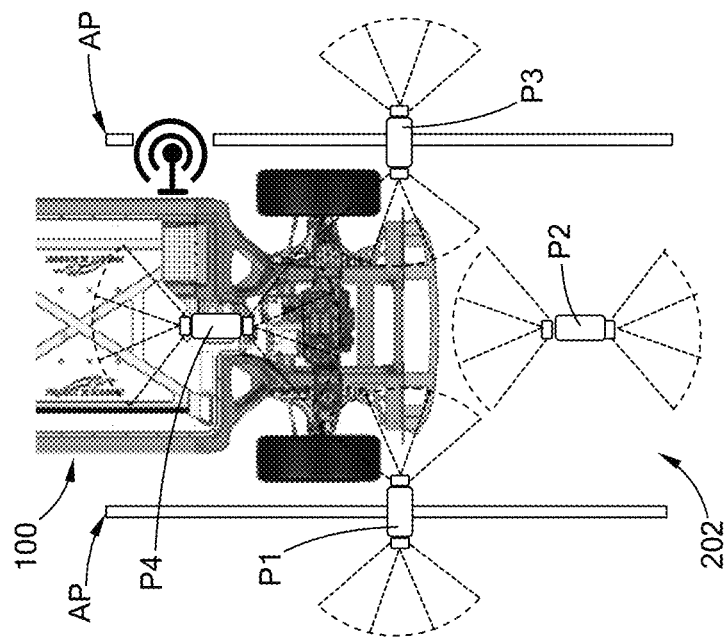
FIG. 4A is a proximity sensor array detecting a modular vehicle subassembly on an assembly pathway according to the teachings of the present disclosure.

Referring to FIGS. 4A and 4B, another non-limiting example of facility based sensors is a proximity sensor array 202 (also referred to herein as "a plurality of facility-based sensors") positioned along an assembly path AP on which a plurality of MVSs 100 move along is shown. The proximity sensor array 202 includes a plurality of proximity sensors P1, P2, P3, P4 configured to provide proximity data on one or more areas proximal to the proximity sensor array 202 and a MVS 100 moving along the assembly path AP. For example, in some variations the plurality of proximity sensors P1-P4 provide proximity data on a MVS 100 as shown in FIG. 4A. In the alternative, or in addition to, the plurality of proximity sensors P1-P4 provide proximity data on objects on or approaching the assembly path as shown in FIG. 4B. Non-limiting examples of proximity data include speed data on a MVS 100 moving along the assembly path AP, location data on a MVS 100 moving along the assembly path AP, distance data on a MVS 100 moving along the assembly path AP, speed data on an object approaching the assembly path AP, speed data on an object approaching a MVS 100 moving along the assembly path AP, location data on an object approaching the assembly path AP, location data on an object approaching a MVS 100 moving along the assembly path AP, distance data on an object approaching the assembly path AP, distance data on an object approaching a MVS 100 moving along the assembly path AP, among others.

Figure 5:
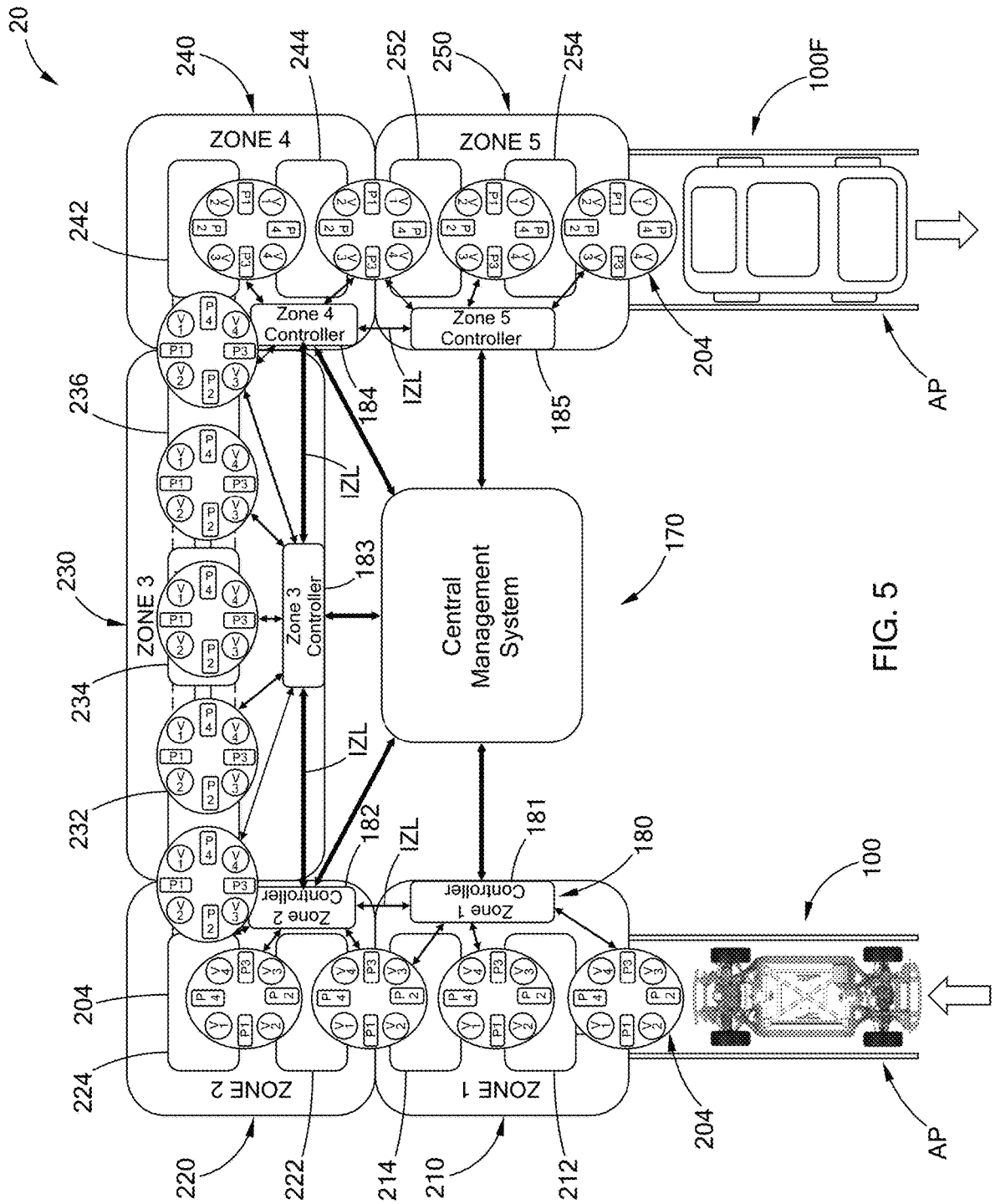
FIG. 5 is a vehicle assembly facility according to the teachings of the present disclosure.

Referring to FIG. 5, a vehicle assembly facility 20 with facility integrated sensors, guidance and control configured to remotely control a plurality of MVSs 100 moving through five assembly zones 210, 220, 230, 240, 250 (also referred to herein as "assembly zones 210-250") along an assembly path AP is shown. The vehicle assembly facility 20 includes a plurality of combined sensor arrays 204 (also referred to herein simply as "sensor arrays" and "a plurality of facility-based sensors") that assist in monitoring and controlling the plurality of MVSs 100 moving along the assembly path AP. In some variations the plurality of combined sensor arrays 204 include the plurality of vision sensors V1-V4 and the plurality of proximity sensors P1-P4. However, it should be understood that one or more of the combined sensor arrays 204 can include only the vision sensors V1-V4 or only the proximity sensors P1-P4. In addition, each of the plurality of combined sensor arrays 204 is not limited to four vision sensors and/or four proximity sensors as discussed above.

Non-limiting examples of assembly stations within the five assembly zones 210-250 include a top hat core structural integration station 212 and a top hat/MVS engine data scan (EDS) integration station 214 in zone 210, a heating, venting, and air conditioning (HVAC) and a trunk/frunk based system station 222, and a dash, flooring and carpet station 224 in zone 220, an interior and seating station 232, a body panel support elements station 234, and a passenger door assembly station 236 in zone 230, a body panels installation station 242 and a hood and hatch assemblies station 244 in zone 240, and a glass and windshields station 252 and a final preparation and controller removal station 254 in zone 250. It should be understood that various parts and components are assembled onto the MVS 100 at each of the stations such that an assembled vehicle 100F is provided when the MVS 100 exits zone 250.

In some variations the vehicle assembly facility 20 includes a central management system 170 and a zone management system 180. In the example shown in FIG. 5, the zone management system 180 includes five zone controllers 181, 182, 183, 184, 185 for the five assembly zones 210, 220, 230, 240, 250, respectively, and each of five zone controllers 181-185 are in communication with adjacent zone controllers via interzone links 'IZL'. The central management system 170 controls the movement of the MVSs 100 remotely through assembly zones 210-250 and assembly stations within each zone. Non-limiting examples of assembly stations within the assembly zones 210-250 include a top hat core structural integration station 212 and a top hat/MVS engine data scan (EDS) integration station 214 in zone 210, a heating, venting, and air conditioning (HVAC) and a trunk/frunk based system station 222, and a dash, flooring and carpet station 224 in zone 220, an interior and seating station 232, a body panel support elements station 234, and a passenger door assembly station 236 in zone 230, a body panels installation station 242 and a hood and hatch assemblies station 244 in zone 240, and a glass and windshields station 252 and a final preparation and controller removal station 254 in zone 250. It should be understood that various parts and components are assembled onto the MVS 100 at each of the stations such that an assembled vehicle 100F is provided when the MVS 100 exits zone 250.

The plurality of combined sensor arrays 204 assist in tracking movement of a plurality of MVSs 100 through the vehicle assembly facility 20 by providing vision data and/or proximity data to a respective zone controller 181-185.

While FIG. 5 shows a single assembly path AP along which the plurality of MVSs 100 move along, in some variations the vehicle assembly facility 20 has more than one assembly path AP. For example, and with reference to FIG. 6, in some variations the vehicle assembly facility 20 has a first primary assembly pathway 'AP1' (referred to herein simply as "first primary pathway") and a second primary assembly pathway 'AP2' (referred to herein simply as "second primary pathway"). Such second primary pathways provide for assembling different top hat configurations on the plurality of MVSs 100. Non-limiting examples of different top hat configurations include sedan top hat configurations, sport utility vehicle (SUV) top hat configurations, truck top hat configurations, trim level (e.g., dash, flooring, carpeting, seats, among others) configurations, among others. Also, it should be understood that a given or particular primary pathway is predefined for a give or particular MVS 100 as a function of the vehicle identification number (VIN) for the MVS 100.

Figure 6:
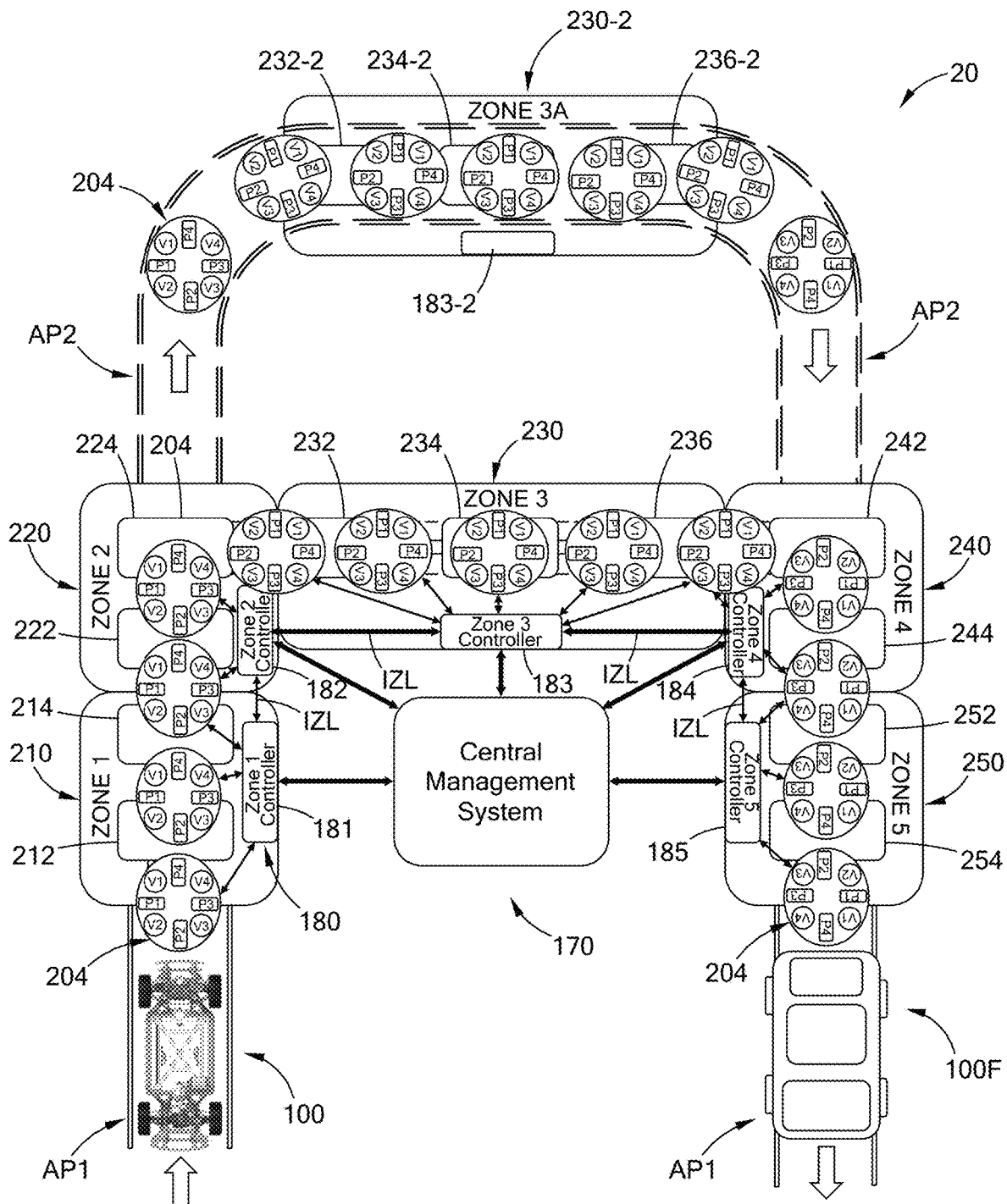
FIG. 6 is the vehicle assembly in FIG. 5 with a secondary assembly pathway according to the teachings of the present disclosure.

In the non-limiting example shown in in FIG. 6, the first primary pathway AP1 is configured for assembly of a first model top hat configuration on MVSs 100 moving along the first primary pathway AP1 through assembly zones 210-250. And second primary pathway AP2 is configured for assembly of a second model top hat configuration on MVSs 100 moving through assembly zones 210, 220, 230-2, 240, 250. It should be understood that the assembly zone 230-2 can have a zone controller 183-2 and one or more combined sensor arrays 204 such that MVS 100 are guided and controlled along the secondary primary pathway AP2 and through the assembly zone 230-2 as described above with respect to FIG. 5.

Figure 7:
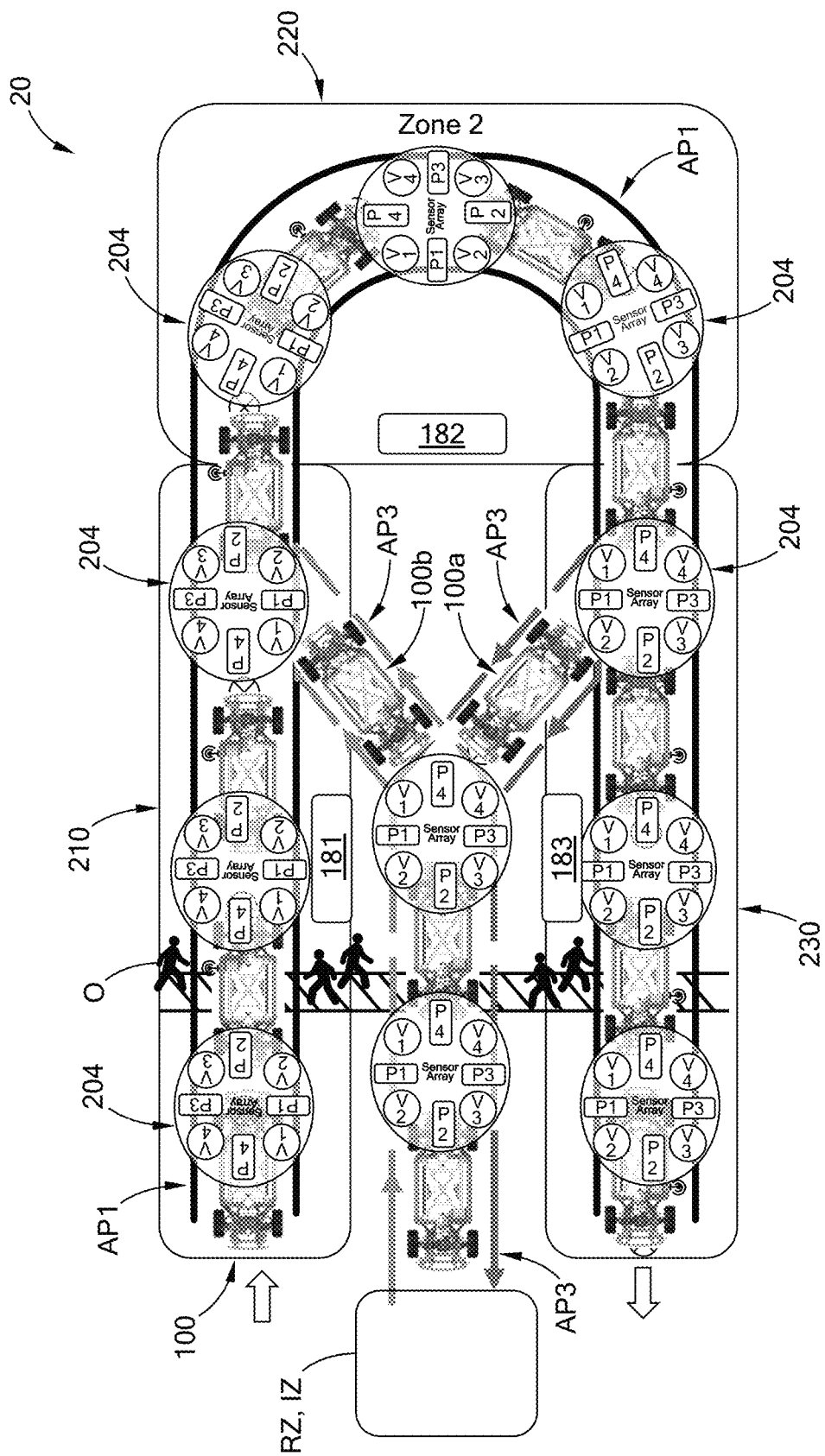
FIG. 7 is a vehicle assembly facility with a secondary assembly pathway according to the teachings of the present disclosure.

In addition to different pathways through different assembly zones and different assembly stations (i.e., first and second primary pathways), in some variations a vehicle assembly facility includes pathways for a MVS to move to other assembly zones and/or assembly stations such as one or more repair stations and one or more inspection stations, among others. For example, and with reference to FIG. 7, in some variations the vehicle assembly facility 20 includes a secondary assembly pathway 'AP3' (referred to herein simply as "secondary pathway"). Such secondary pathways provide for MVSs 100 to be removed from a first primary pathway AP1 and/or a second primary pathway AP2 for repair and/or inspection. In the non-limiting example shown in FIG. 7, a plurality of MVSs 100 are shown moving along the first primary pathway AP1 through assembly zones 210, 220, 230. In addition, a MVS 100a is shown desirably removed from the first primary pathway AP1 by directing the MVS 100a onto and along the secondary pathway AP3. Accordingly, the MVS 100a can be directed to a repair zone 'RZ', an inspection zone 'IZ', among others. Also, and after repair and/or inspection, a MVS 100b is desirably re-introduced onto the first primary pathway AP1 by directing the MVS 100b from the secondary pathway AP3 onto and along the first primary pathway AP1 as shown in FIG. 7.

Accordingly, vehicle assembly facilities according to the teachings of the present disclosure provide remote controlled movement of MVSs 100 under their own power and along a plurality of assembly pathways such that assembly of different vehicles models and/or configurations without the use or with a reduction in conveyor systems and/or AGVs. For example, and with reference to FIG. 8, a plurality of MVSs 100 moving along an assembly path AP in the vehicle assembly facility 20 using their own power is shown and described. Particularly, and for a MVS 100a in assembly zone 230, the onboard controller 120 (FIG. 1) of the MVS 100a is in communication with the zone controller 183 via the onboard communications link 122 and the zone controller communications link 183b. In at least one variation, the zone controller 183 uses a dual band or dual channels to transmit and receive instructions and data and thereby remotely control the MVS 100a. For example, in some variations the zone controller 183 and the onboard controller 120 communicate using a primary link PL and a secondary link SL. In such variations, the primary link PL controls the movement of the MVS 100 and the secondary link SL monitors the movement of the MVS 100a. Also, it should be understood that using dual channels enhances connectivity between the zone controller 183 and the onboard controller 120.

As the zone controller 183 manages the operation and movement of the MVS 100a through zone 230, the interior and seating are installed at station 232, body panel support elements are installed at station 234, and passenger doors are assembled and hung at station 236. In some variations of the present disclosure, the zone controller 183, and other zone controllers discussed herein, provide process related services such as instructions and/or data related to tracking of the MVS 100a (i.e., MVS tracking), guidance of the MVS 100a (i.e., MVS guidance), movement control and coordination of the MVS 100a (i.e., MVS movement control and coordination), and management of the signaling interface between the zone controller 183 and the onboard controller 120, among others.

Figure 8:
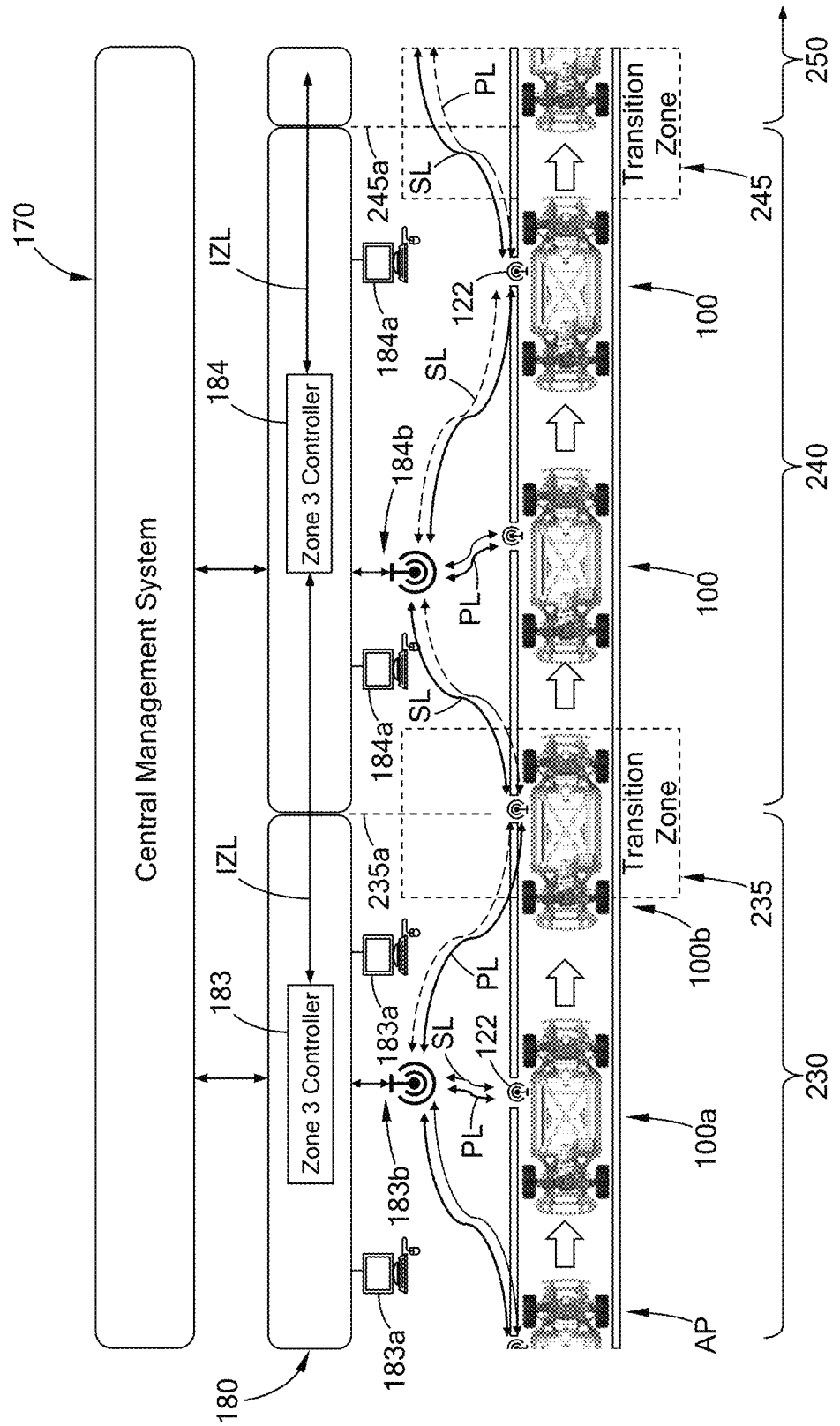
FIG. 8 is a plurality of modular vehicle subassemblies moving through a plurality of assembly zones of the vehicle assembly facility in FIG. 5.

"Hand-off" of control and management of a MVS 100b in a transition zone 235 between from zone 230 to zone 240 is also shown in FIG. 8. Particularly, as the MVS 100b approaches zonal boundary 235a, i.e., a boundary between zones 230 and 245, the MVS 100b moves into the transition zone 235. At a predefined distance from the zonal boundary 235a the zone controller 183 for Zone 230 releases or terminates the secondary link SL (shown by dotted line SL in FIG. 8) and the zone controller 184 for the zone 240 picks up (i.e., establishes communication with) the MVS 100b via the secondary link SL extending between the zone controller 184 and the MVS 100b. The zone controller 183 for zone 230 releases the primary link PL and the zone controller 184 for the Zone 240 establishes control of the MVS 100b via the primary link PL. The MVS 100 continues to move along the predetermined assembly path AP in Zone 240 with the primary link PL and the secondary link SL in communication with zone controller 184 via the onboard communications link 122 and the zone controller communications link 184b. It should be understood that in some variations of the present disclosure the interzone link IZL between the zone controllers 183 and 184 assists in the hand-off of control and management of the MVS 100 from zone 230 to zone 240. It should that while not shown in FIG. 8, a plurality of vision sensor arrays 200, a plurality of proximity sensor arrays 202, and/or a plurality of combined sensor arrays 204 are included along the assembly pathway AP in FIG. 8.

Figure 9:
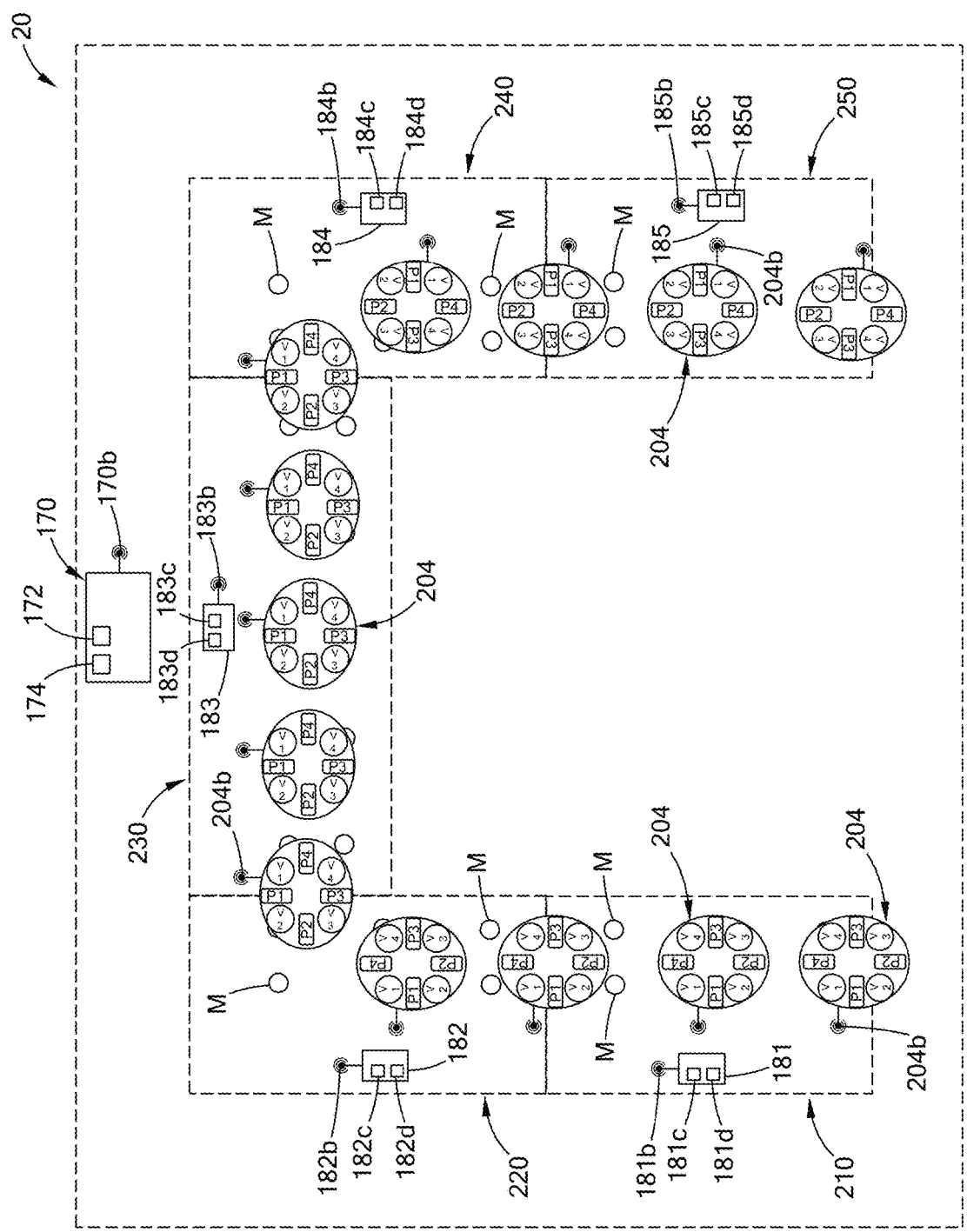
FIG. 9 is a block diagram of a navigation system for a vehicle assembly facility according to the teachings of the present disclosure.

Referring to FIG. 9, a functional block diagram of the vehicle assembly facility 20 includes the central management system 170 and the plurality of zone controllers 181-185. The central management system 170 includes a communications link 170b, memory 172 and at least one processor 174. In some variations, one or more the zone controllers 181-185 include a memory 181c-185c, and in some variations one or more of the zone controllers 181-185 include a processor 181d-185d. The memory 172 and/or one or more of the memories 181c-185c (and a memory for zone controller 183-2) include or have a stored navigation algorithm described in greater detail below.

In at least one variation, each of the zone controllers 181-185 is in direct communication with the central management system 170, e.g., via the communications links 181b-185b and 170b. While the communication links 181b-185b and 170b are illustrated as wireless communication links in FIG. 9, it should be understood that in some variations one or more of the communication links 181b-185b and 170b are wired communication links. In other variations, only a subset of the zone controllers 181-185 are in direct communication with the central management system 170. For example, the zone controller 181 can be in direct communication with the zone controller 182 (e.g., via an IZL link (FIG. 5)) and not in direct communication with the central management system 170, and the zone controller 182 serves as a communication link between the zone controller 181 and the central management system 170. The vehicle assembly facility includes the plurality of combined sensor arrays 204 along the assembly path AP (not shown in FIG. 9) and in some variations each combined sensor array 204 has a communications link 204b (e.g., a wireless or wired communications link). Each assembly zone 210-250 has at least one zone controller 181-185, respectively, assigned thereto and a combined sensor array 204 assigned to a given assembly zone is in communication with at least the zone controller assigned to the given assembly zone. For example, the combined sensor array 204 shown fully or completely within the assembly zone 210 is in communication with the zone controller 181, the combined sensor array 204 shown fully or completely within the assembly zone 220 is in communication with the zone controller 182, the three combined sensor arrays 204 shown fully or completely within the assembly zone 230 are in communication with the zone controller 183, the combined sensor array 204 shown fully or completely within the assembly zone 240 is in communication with the zone controller 184, and the combined sensor array 204 shown fully or completely within the assembly zone 250 is in communication with the zone controller 185.

Regarding combined sensor arrays 204 shown between or positioned partially in two assembly zones, in some variations of the present disclosure such combined sensor arrays 204 are in communication with two zone controllers. For example, the combined sensor array 204 shown positioned within or between the assembly zones 210, 220 can be in communication with the zone controllers 181, 182, the combined sensor array 204 shown positioned within or between the assembly zones 220, 230 can be in communication with the zone controllers 182, 183, the combined sensor array 204 shown positioned within or between the assembly zones 230, 240 can be in communication with the zone controllers 183, 184, and the combined sensor array 204 shown positioned within or between the assembly zones 240, 250 can be in communication with the zone controllers 184, 185.

In some variations, the vehicle assembly facility 20 includes a plurality of markers 'M' assigned to and positioned along the assembly path AP. Non-limiting examples of markers M include visual markers detectable by a vision sensor, structural markers detectable by a vision sensor and/or a proximity sensor, beacon marker that transmits a wireless signal, among others. In such variations, the combined sensor arrays 204 can be configured to transmit at least one of proximity data and visual data of the markers M and the MVSs 100 moving through the plurality of assembly zones 210-250 to the plurality of zone controllers 181-185. Also, the plurality of zone controllers 181-185 and/or the central management system 170 is/are configured to calculate a position of the MVS 100 based on the transmitted proximity data and/or visual data.

In at least one variation, each of the zone controllers 181-185 are configured to detect a broken wireless communication connection between the zone controllers 181-185 and an onboard controller 120 of a MVS 100 moving through the assembly zones 210-250. In such variations, and when a broken wireless communication connection is detected, each of the zone controllers 181-185 is configured to execute a reconnect wireless communication request, e.g., with an onboard controller 120 with which a broken wireless communication connection is detected. Also, each of the onboard controllers is configured to execute a MVS stop command such that one of more of the plurality of MVSs 100 stop moving until a wireless communication connection is re-established.

In some variations, each of the plurality of zone controllers 181-185 is configured to transmit a self-test command to the plurality of onboard controllers 120 of the plurality of MVSs 100, and each of the plurality of onboard controllers 120 is configured to execute the self-test command. And in at least one variation, each of the onboard controllers 120 is configured to transmit a repair or inspection needed signal to the zone controllers 181-185 and the navigation algorithm is configured to execute or set a "line side" repair flag or a "line removal" repair flag as described below (FIG. 10).

Figure 10:
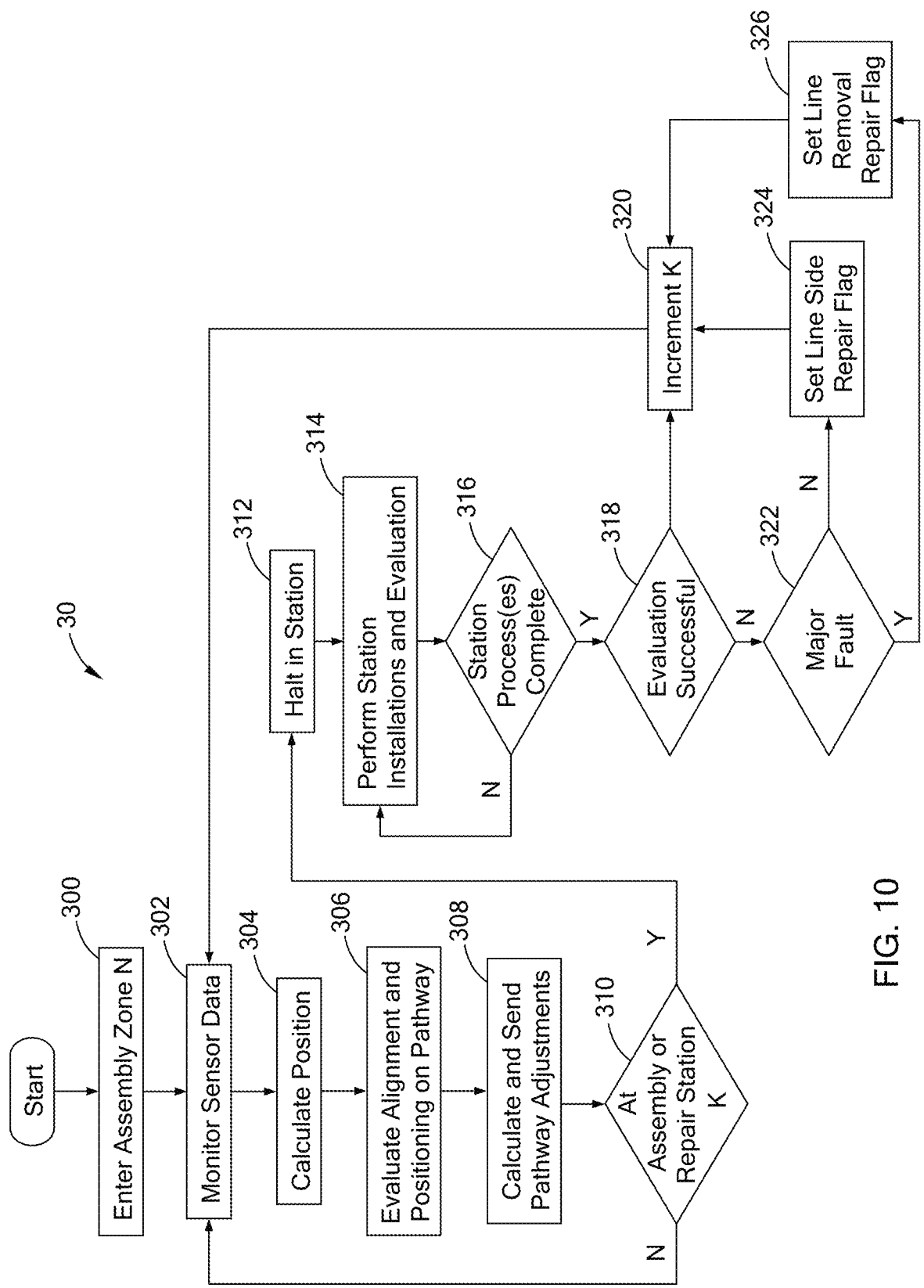
FIG. 10 is a flow chart for a method of navigating a plurality of modular vehicle subassemblies through a vehicle assembly facility according to one form of the present disclosure.

Referring now to FIG. 10, a flow chart for a method 30 of navigating a MVS 100 through the vehicle assembly facilities 20 shown in FIGS. 5-7 using the navigation algorithm mentioned above is shown. The method 30 directs or navigates a MVS 100 into an assembly zone N at 300. It should be understood that before the MVS 100 enters the assembly zone N (e.g., N=1=assembly zone 210) at 300, the MVS 100 has a vehicle identification number (VIN) and the VIN of the MVS 100 has been scanned such that the pathway for the MVS 100 through the vehicle assembly facility 20 has been determined (predefined). That is, the VIN for a given MVS 100 determines the make, model, and/or accessories, among others, of a top hat to be assembled onto the MVS 100. Accordingly, the VIN determines or dictates a predefined pathway for the MVS 100 to move through the vehicle assembly facility 20 under its own power. For example, a VIN of a first MVS 100 results in the first MVS 100 being assigned to and moving through assembly zones 210, 220, 230, 240, 250 via the first primary pathway AP1 (FIG. 6) while a VIN of a second MVS 100 results in the second MVS 100 being assigned to and moving through assembly zones 210, 220, 230a, 240, 250 via the first primary pathway AP1 and the secondary pathway AP2 (FIG. 6).

After and/or while entering the assembly zone N, the method 30 monitors sensor data at 302, calculates a position of the MVS 100 at 304, and evaluates alignment and positioning of the MVS 100 on the assembly pathway AP at 306. For example, sensor data can be transmitted by one or more of the combined sensor arrays 204 and received by the one or more of the zone controllers 181-185 and/or the central management system 170. In some variations the sensor data is vision data and/or proximity data (as described above) on a MVS 100 moving along the assembly pathway AP. Accordingly, the one or more of the zone controllers 181-185 and/or the central management system 170 determines pathway characteristics of the MVS 100 such as alignment of the MVS 100 on the assembly pathway AP, a distance between the MVS 100 and other MVSs 100 on the assembly pathway AP, a speed of the MVS 100 moving along the assembly pathway AP, among others.

Based on the pathway characteristics and/or the magnitude of a pathway characteristic, e.g., whether or not the MVS 100 is moving towards one side or edge of the assembly pathway AP, how much the MVS 100 has moved to one side of the assembly pathway AP, how close the MVS 100 is to another MVS 100 and/or another object on the assembly pathway AP, among others, the method 30 calculates and sends assembly path adjustments to the MVS 100 at 308. For example, in some variations of the present disclosure steering, acceleration and/or braking adjustments (referred to herein as "pathway adjustment instructions") are calculated by and transmitted from one or more of the zone controllers 181-185 (and zone controller 183-2) to the onboard controller 120 of the MVS 100 such that the MVS 100 continues to desirably move along the assembly pathway AP. It should be understood that in other variations of the present disclosure pathway adjustment instructions are calculated by and transmitted from the central management system 170 to one or more of the zone controllers 181-185 (and zone controller 183-2), and the one or more of the zone controllers 181-185 (and zone controller 183-2) transmit the pathway adjustment instructions to the onboard controller 120 of the MVS 100 such that the MVS 100 continues to desirably move along the assembly pathway AP.

The method 30 proceeds to 310 and determines whether or not the MVS 100 is at an assembly/repair station K (e.g., K=1=assembly station 212) in assembly zone N. If the MVS 100 is not at the assembly/repair station K, the method 30 returns to 302 where sensor data is monitored as discussed above. This cycle of 302-308 continues until the method 30 determines the MVS 100 is at an assembly/repair station K at 310. Then the method proceeds to 312 where halt instructions (slow down and stop) are transmitted to the MVS 100 such that the MVS 100 stops at a desired location along the assembly path AP, and assembly of one or more components onto the MVS 100 is performed at 314. Evaluation (e.g., inspection and/or testing) of the assembly of the one or more components is also performed at 314.

The method 30 proceeds to 316 and determines whether or not the assembly of the one or more components at the assembly station K is complete. If the assembly of the one or more components at the assembly station K is not complete, the method returns to 314 where additional or continued assembly occurs. This cycle of 314-316 continues until the assembly of the one or more components at the assembly station K is complete. The method 30 then proceeds to 318 and determines whether or not the assembly of the one or more components at the assembly station K was successful, i.e., whether or not the evaluation of the assembly of the one or more components at the assembly station K determined that the one or more components were desirably installed/assembled. If the evaluation was successful at 318, the method 30 proceeds to 320 where K is incremented (e.g., K is incremented from K=1 to K=2, and K=2=equals assembly station 214), and then returns to 302 where sensor data is monitored as the MVS 100 moves to the next assembly station. If the evaluation was not successful at 318, the method 30 proceeds to 322 where a determination of whether or not a major fault has been detected occurs. As used herein, the phrase "major fault" refers to a repair that is desired on or for the MVS 100 that cannot be performed on the assembly line, i.e., on the assembly pathway AP.

If a major fault has not detected at 322, the method 30 proceeds to 324 where a "line side repair" flag is set or issued for the MVS 100. As used herein, the phrase "line side repair" refers to a repair that can or is made to the MVS 100 as it moves along the assembly pathway AP. For example, if the evaluation at 314/318 determines a repair is needed with respect to the one or more components assembled at the assembly station K, and it is not a major fault, the line side repair flag notifies one or more operators (workers) what repair is needed, and the one or more operators perform or execute the repair while the MVS is on the assembly path AP such that the MVS 100 is not taken off or removed from the assembly pathway AP. In some variations, the repair is performed at the assembly station K where the line side repair flag is set, while in other variations the repair is performed at the next subsequent assembly station or somewhere within the next two, three or five, among others, assembly stations depending on the repair that needs to be made. Accordingly, the MVS 100 stays on and continues moving along the assembly pathway AP.

In the alternative, i.e., a major fault is detected at 322, the method 30 proceeds to 326 where a "line removal" flag is set or issued for the MVS 100. As used herein, the phrase "line removal" refers to a repair that is made to the MVS 100 at a repair station that is not on the assembly pathway AP (e.g., at repair zone RZ in FIG. 7). After the line removal flag is set for the MVS 100 at 326, the method 30 proceeds to 320 where K is incremented, and then returns to 302 where sensor data is monitored as the MVS 100 moves to the next assembly station. It should be understood that the MVS 100 will move along the assembly pathway AP until the MVS 100 can be removed from the assembly pathway AP via a secondary pathway (e.g., secondary pathway AP3). It should also be understood that after the MVS 100 has moved through all of the assembly stations K in a given assembly zone N, the MVS 100 is handed off to the next assembly zone N as described above with respect to FIG. 8, and the method 30 continues or guides the MVS 100 through the assembly stations K in the next assembly station N until the assembled vehicle 100F exits the assembly pathway AP.

While the navigation system has been discussed with respect to a first primary pathway AP1, a second primary pathway AP2, and a secondary pathway AP3, it should be understood that the navigation system includes remote control of MVSs along additional pathways within a vehicle assembly facility that are needed or desired for assembly of various top hats onto the MVSs moving via remote control and under their own power through a plurality of assembly zones of a vehicle assembly facility.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller", "processor", and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A navigation system for remote control movement of modular vehicle subassemblies (MVSs) through a plurality of assembly zones of a vehicle assembly facility, the navigation system comprising:
    a predefined primary pathway configured for the MVSs to move along during assembly of top hats on the MVSs;
    a plurality of sensors, a plurality of zone controllers, a central management system, and a navigation algorithm, wherein:
        the plurality of sensors are configured to be assigned to the plurality of assembly zones such that each of the plurality of assembly zones has at least one of the plurality of sensors assigned thereto, and the plurality of sensors are configured to transmit at least one of proximity data and visual data on the MVSs moving through the plurality of assembly zones to the plurality of zone controllers;
        the plurality of zone controllers are configured to be assigned to the plurality of assembly zones such that each of the plurality of assembly zones has at least one of the plurality of zone controllers assigned thereto, and each of the plurality of zone controllers is configured to be in communication with at least one of the plurality of sensors and receive the at least one of proximity data and visual data;
        the central management system is configured to be in communication with each of the plurality of zone controllers;
        the navigation algorithm is configured to receive the at least one of proximity data and visual data, and calculate pathway adjustment instructions for remote control movement of the MVSs moving through the plurality of assembly zones;
        the plurality of zone controllers are in communication with the modular vehicle subassemblies via a plurality of communications links;
        the plurality of communications links include a plurality of primary links and a plurality of secondary links;
        the plurality of primary links are configured to control the movement of the plurality of modular vehicle subassemblies;
        the plurality of secondary links are configured to monitor the movement of the plurality of modular vehicle subassemblies;
        the modular vehicle subassembly is communicably coupled to an active zone controller via the primary and secondary communication links when in the active zone; and
        the modular vehicle subassembly is communicably coupled to the active zone controller via the primary communication link and an adjacent zone controller via the secondary communication links when it is in a transition zone between two active zones.

2. The navigation system according to claim 1 further comprising markers assigned to the predefined primary pathway, wherein the markers comprise at least one of a visual marker, an assembly path marker, and an infrastructure marker.

3. The navigation system according to claim 1, wherein the plurality of sensors comprises at least one of a plurality of vision sensors and a plurality of a proximity sensors.

4. The navigation system according to claim 3, wherein the plurality of vision sensors are configured to transmit the visual data, the visual data comprising pathway alignment visual data for the MVSs moving through the plurality of assembly zones.

5. The navigation system according to claim 3, wherein the plurality of proximity sensors are configured to transmit the proximity data, the proximity data comprising at least one of pathway alignment data of the MVSs moving through the plurality of assembly zones, detection data on the MVSs entering the plurality of assembly zones, tracking data of the MVSs moving through the plurality of assembly zones, distance data of the MVSs approaching the plurality of assembly zones, distance data of the MVSs leaving the plurality of assembly zones, speed data of at least one object approaching the MVSs moving through the plurality of assembly zones, location data of at least one object approaching the MVSs moving through the plurality of assembly zones, and distance data between at least one object and the MVSs moving through the plurality of assembly zones.

6. The navigation system according to claim 1, wherein the pathway adjustment instructions comprise pathway alignment adjustment instructions, MVS speed adjustment instructions, MVS halt instructions, and MVS accelerate instructions.

7. The navigation system according to claim 6 further comprising a plurality of assembly stations along the predefined primary pathway, wherein the plurality of zone controllers are configured to transmit the MVS halt instructions to the MVSs moving through the plurality of assembly zones such that each MVS halts at one or more of the assembly stations.

8. The navigation system according to claim 7, wherein each of the plurality of assembly stations is configured to assemble at least one component on a given MVS that halts at a given assembly station.

9. The navigation system according to claim 8, wherein the central management system is configured to evaluate the assembly of the at least one component on the given MVS that halts at the given assembly station.

10. The navigation system according to claim 9, wherein the central management system is configured to determine a successful evaluation and an unsuccessful evaluation for the assembly of the at least one component on the given MVS that halts at the given assembly station.

11. The navigation system according to claim 9, wherein the central management system is configured to assign at least one of a line side repair flag and a line removal repair flag for a determined unsuccessful evaluation for the assembly of the at least one component on the given MVS that halts at the given assembly station.

12. The navigation system according to claim 1, wherein the navigation algorithm is configured to calculate a potential impact parameter for at least one object approaching at least one of the MVSs as a function of the at least one of proximity data and visual data.

13. The navigation system according to claim 1 further comprising a plurality of onboard controllers configured to be assigned to the MVSs such that each of the MVSs has an onboard controller, wherein each of the plurality of onboard controllers is configured to be in wireless communication with at least one of the plurality of zone controllers during movement of the MVSs moving through the plurality of assembly zones.

14. The navigation system according to claim 13, wherein each of the plurality of zone controllers is configured to detect a broken wireless communication connection and execute a reconnect wireless communication request.

15. The navigation system according to claim 14, wherein the plurality of zone controllers are configured to transmit a self-test command to the plurality of onboard controllers and each of the plurality of onboard controllers is configured to execute the self-test command.

16. A navigation system for remote control movement of modular vehicle subassemblies (MVSs) through a plurality of assembly zones of a vehicle assembly facility, the system comprising:
a predefined primary pathway configured for the MVSs to move along during assembly of top hats on the MVSs;
markers assigned to the predefined primary pathway;
a plurality of sensors, a plurality of onboard controllers, a plurality of zone controllers, a central management system, and a navigation algorithm, wherein:
the plurality of sensors are configured to be assigned to the plurality of assembly zones such that each of the plurality of assembly zones has at least one of the plurality of sensors assigned thereto and transmit at least one of proximity data and visual data of the markers and the MVSs moving through the plurality of assembly zones to the plurality of zone controllers;
the plurality of onboard controllers are configured to be assigned to the MVSs such that each of the MVSs has an onboard controller;
the plurality of zone controllers are configured to be assigned to the plurality of assembly zones such that each of the plurality of assembly zones has at least one of the plurality of zone controllers assigned thereto, and each of the plurality of zone controllers is configured to be in communication with at least one of the plurality of sensors and the plurality of onboard controllers and receive the at least one of proximity data and visual data;
the central management system is configured to be in communication with each of the plurality of zone controllers;
the navigation algorithm is configured to receive the at least one of proximity data and visual data, and calculate pathway adjustment instructions for remote control movement of the MVSs moving through the plurality of assembly zones;
the plurality of zone controllers are in communication with the modular vehicle subassemblies via a plurality of communications links;
the plurality of communications links include a plurality of primary links and a plurality of secondary links;
the plurality of primary links are configured to control the movement of the plurality of modular vehicle subassemblies;
the plurality of secondary links are configured to monitor the movement of the plurality of modular vehicle subassemblies;
the modular vehicle subassembly is communicably coupled to an active zone controller via the primary and secondary communication links when in the active zone; and the modular vehicle subassembly is communicably coupled to the active zone controller via the primary communication link and an adjacent zone controller via the secondary communication links when it is in a transition zone between two active zones.

17. The navigation system according to claim 16, wherein the pathway adjustment instructions comprise pathway alignment adjustment instructions, MVS speed adjustment instructions, MVS halt instructions, and MVS accelerate instructions.

18. The navigation system according to claim 17 further comprising a plurality of assembly stations along the predefined primary pathway, wherein the plurality of zone controllers are configured to transmit the MVS halt instructions to the MVSs moving through the plurality of assembly zones such that each MVS halts at one or more of the assembly stations, and each of the plurality of assembly stations is configured to assemble at least one component on a given MVS that halts at a given assembly station.

19. A navigation system for remote control movement of modular vehicle subassemblies (MVSs) through a plurality of assembly zones of a vehicle assembly facility, the system comprising:
- a predefined primary pathway configured for the MVSs to move along during assembly of top hats on the MVSs;
- markers assigned to the predefined primary pathway;
- a plurality of sensors;
- a plurality of onboard controllers; a plurality of zone controllers;
- a central management system; and
- a navigation algorithm configured to calculate pathway adjustment instructions, wherein:
  - the plurality of sensors are configured to be assigned to the plurality of assembly zones such that each of the plurality of assembly zones has at least one of the plurality of sensors assigned thereto, at least a first subset of the plurality of sensors is configured to detect the markers, and at least a second subset of the plurality of sensors is configured to transmit at least one of proximity data and visual data of the MVSs moving through the plurality of assembly zones to the plurality of zone controllers;
  - the plurality of onboard controllers are configured to be assigned to the MVSs such that each of the MVSs has an onboard controller;
  - the plurality of zone controllers are configured to be assigned to the plurality of assembly zones such that each of the plurality of assembly zones has at least one of the plurality of zone controllers assigned thereto, and each of the plurality of zone controllers is configured to be in communication with at least one of the plurality of sensors and the plurality of onboard controllers and receive the at least one of proximity data and visual data;
  - the central management system is configured to be in communication with each of the plurality of zone controllers;
  - the navigation algorithm is configured to receive the at least one of proximity data and visual data, and calculate the pathway adjustment instructions for remote control movement of the MVSs moving through the plurality of assembly zones
  - the plurality of zone controllers are in communication with the modular vehicle subassemblies via a plurality of communications links;
  - the plurality of communications links include a plurality of primary links and a plurality of secondary links;
  - the plurality of primary links are configured to control the movement of the plurality of modular vehicle subassemblies;
  - the plurality of secondary links are configured to monitor the movement of the plurality of modular vehicle subassemblies;
  - the modular vehicle subassembly is communicably coupled to an active zone controller via the primary and secondary communication links when in the active zone; and
  - the modular vehicle subassembly is communicably coupled to the active zone controller via the primary communication link and an adjacent zone controller via the secondary communication links when it is in a transition zone between two active zones.

20. The navigation system according to claim 19, wherein the pathway adjustment instructions comprise pathway alignment adjustment instructions, MVS speed adjustment instructions, MVS halt instructions, and MVS accelerate instructions.

* * * * *